June 21, 1949.  H. G. KELLOGG  2,473,590
METHOD AND APPARATUS FOR ASSEMBLING PARTS
Filed Nov. 18, 1946  8 Sheets-Sheet 3
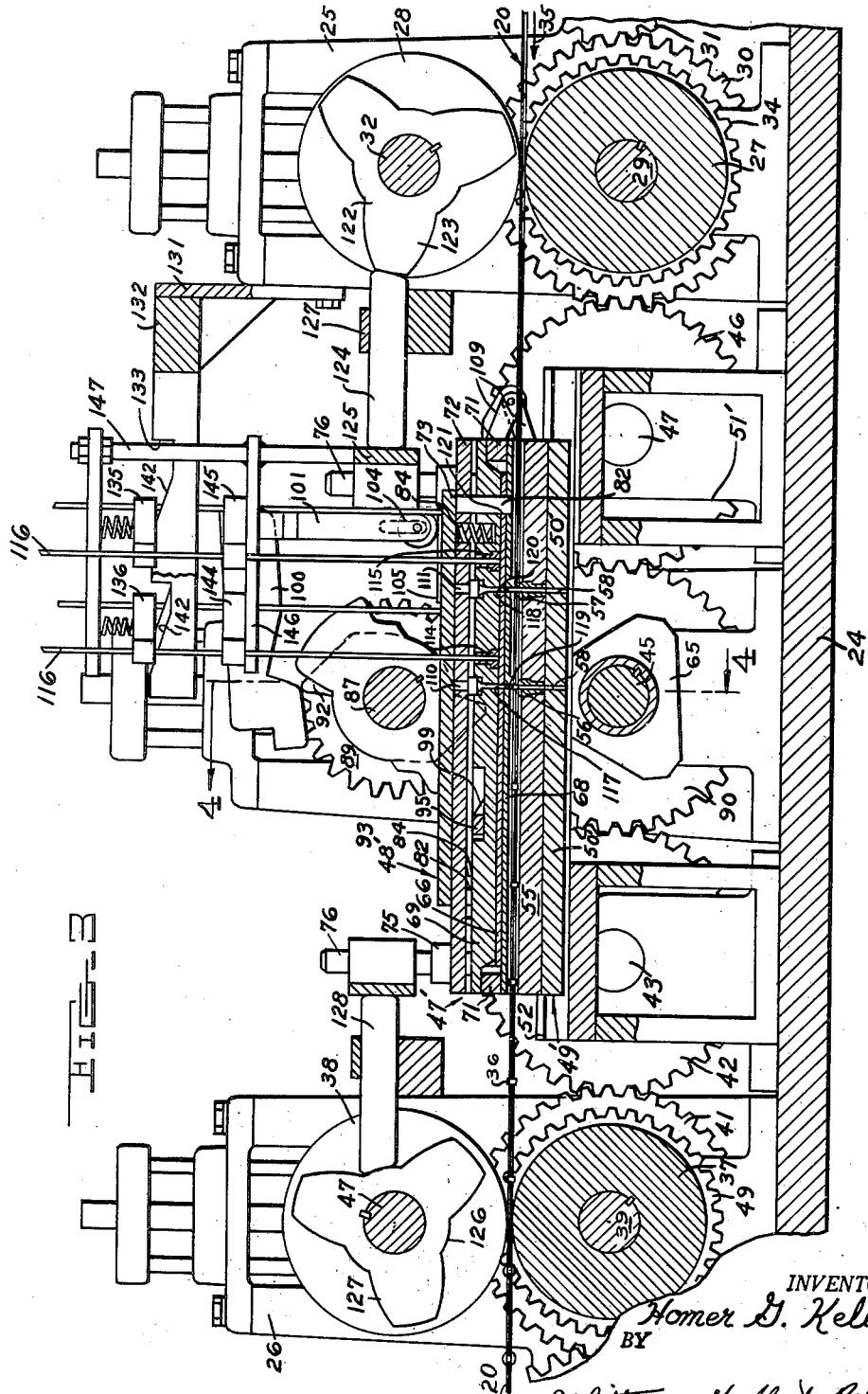
INVENTOR.
Homer G. Kellogg
BY
Whittemore Hulbert & Belknap
ATTORNEYS

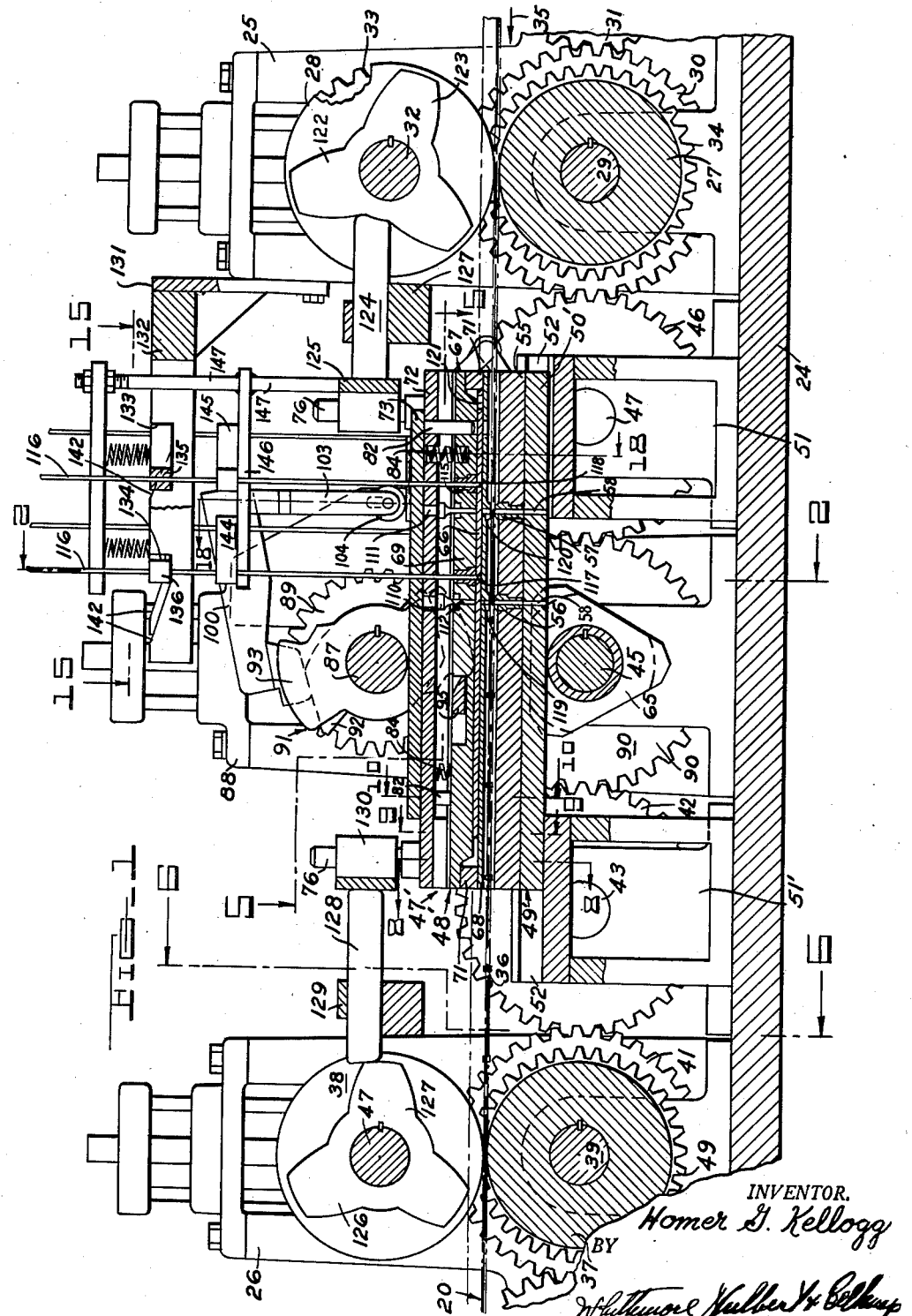

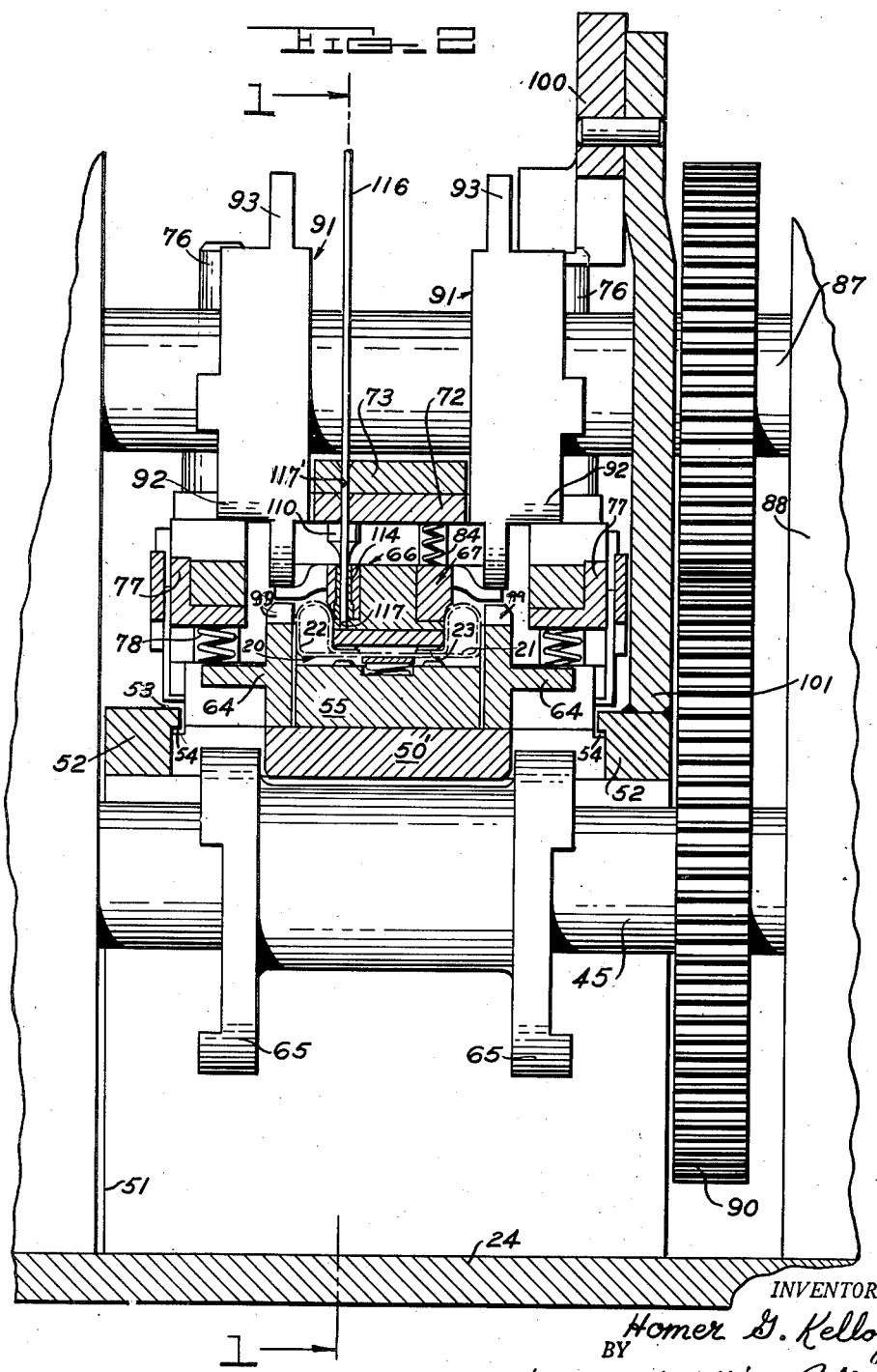

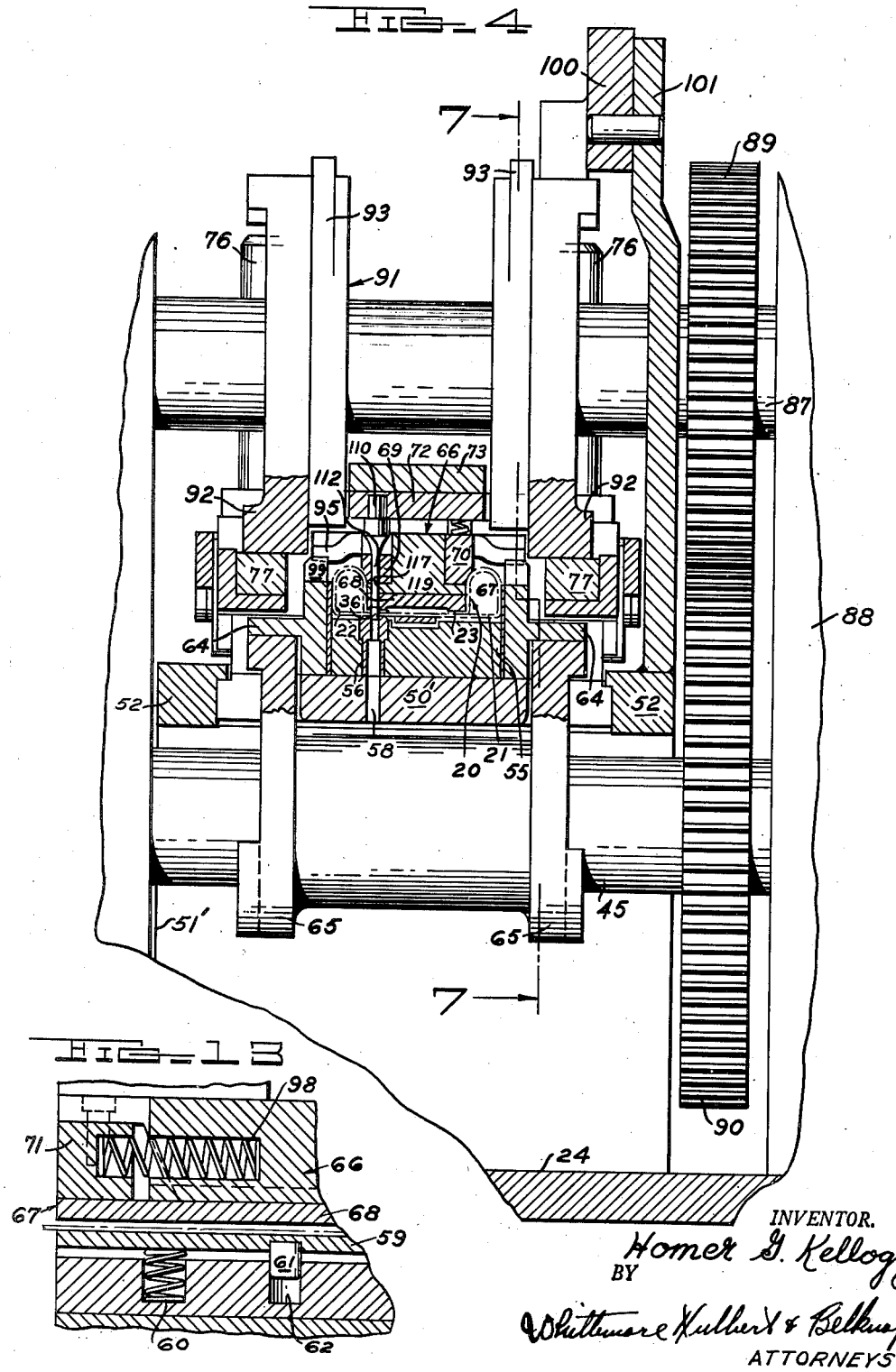

June 21, 1949.  H. G. KELLOGG  2,473,590
METHOD AND APPARATUS FOR ASSEMBLING PARTS
Filed Nov. 18, 1946  8 Sheets-Sheet 5
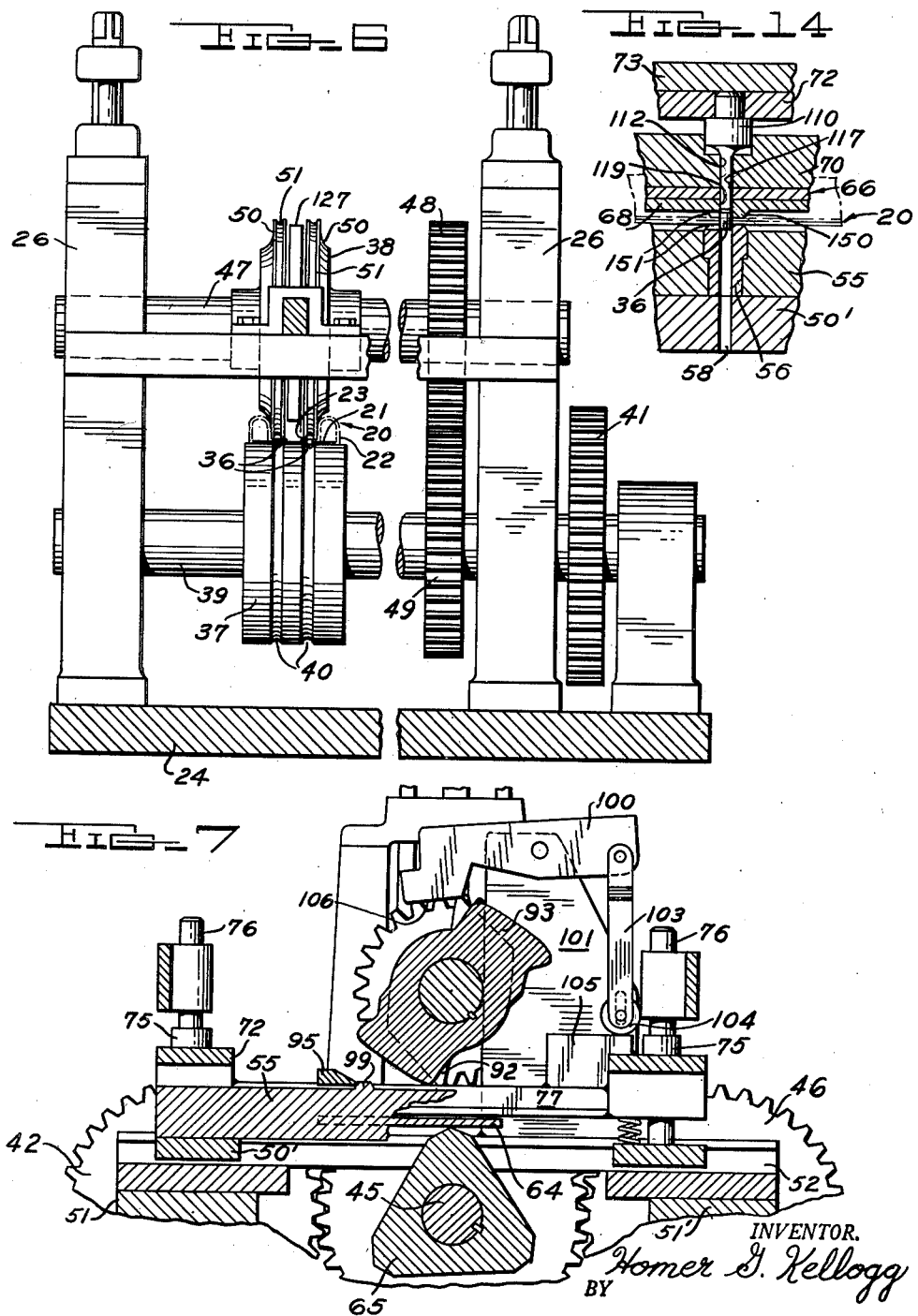
INVENTOR.
Homer G. Kellogg
BY
Whittemore Hulbert & Belknap
ATTORNEYS

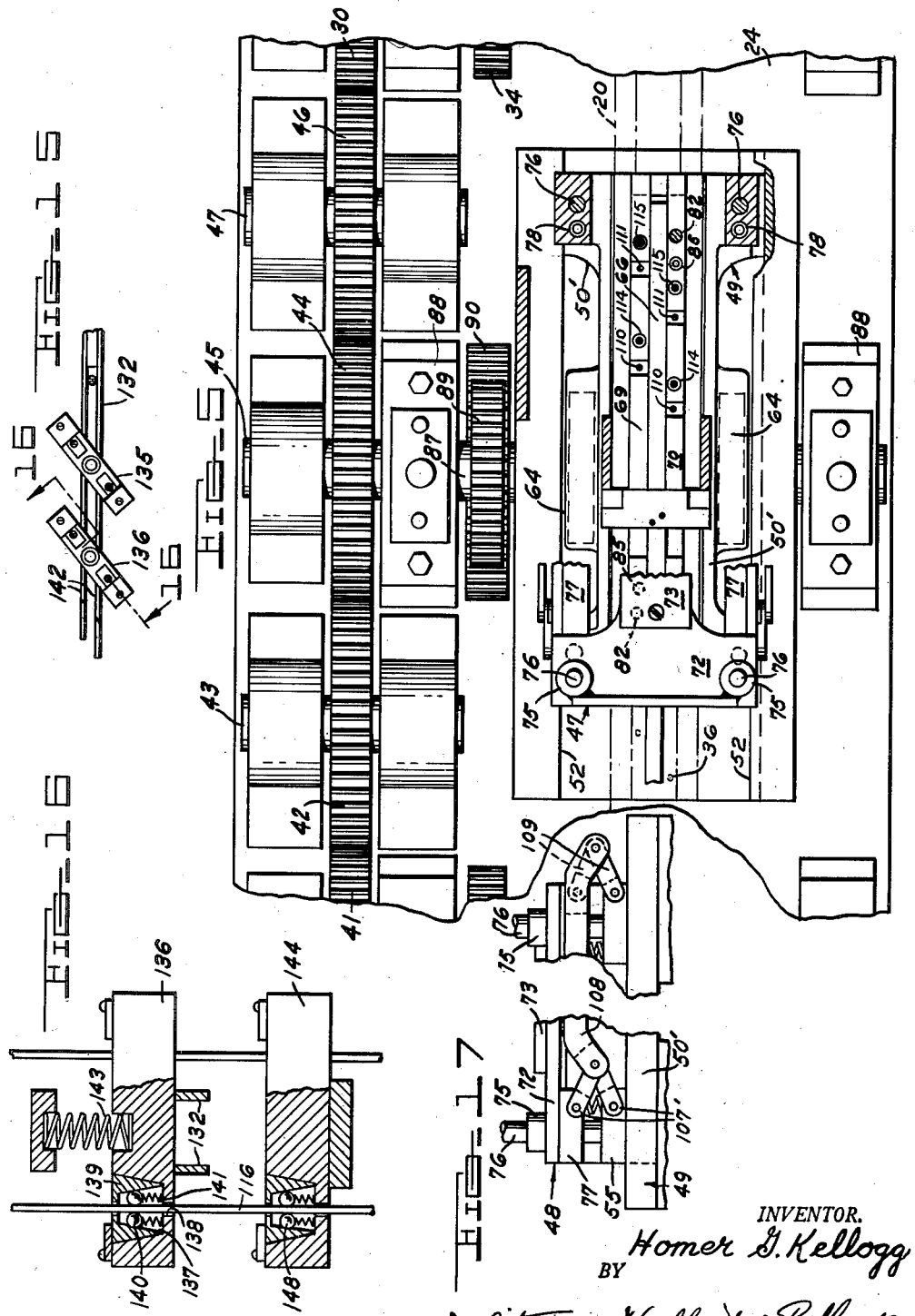

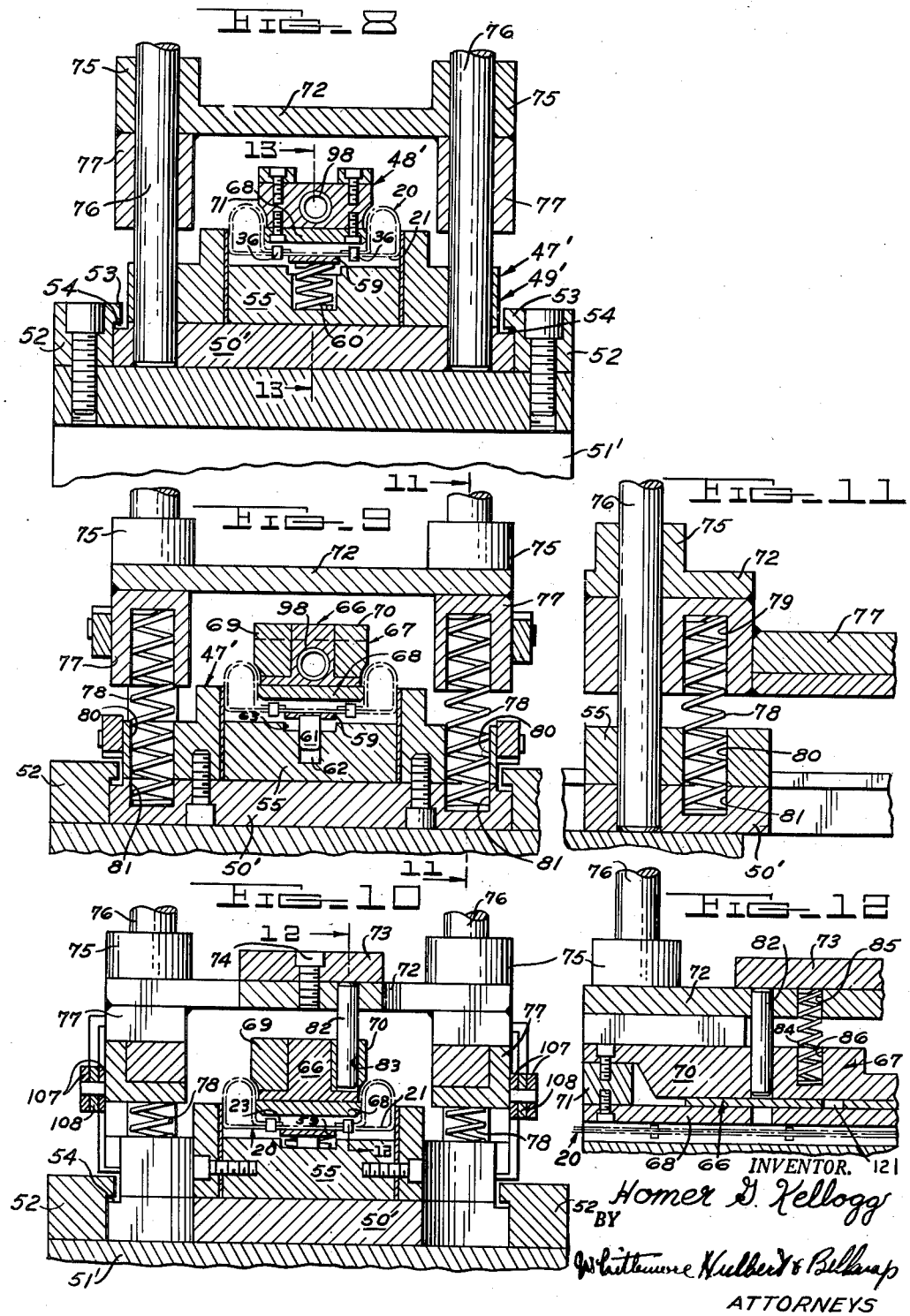

June 21, 1949. H. G. KELLOGG 2,473,590
METHOD AND APPARATUS FOR ASSEMBLING PARTS
Filed Nov. 18, 1946 8 Sheets-Sheet 8
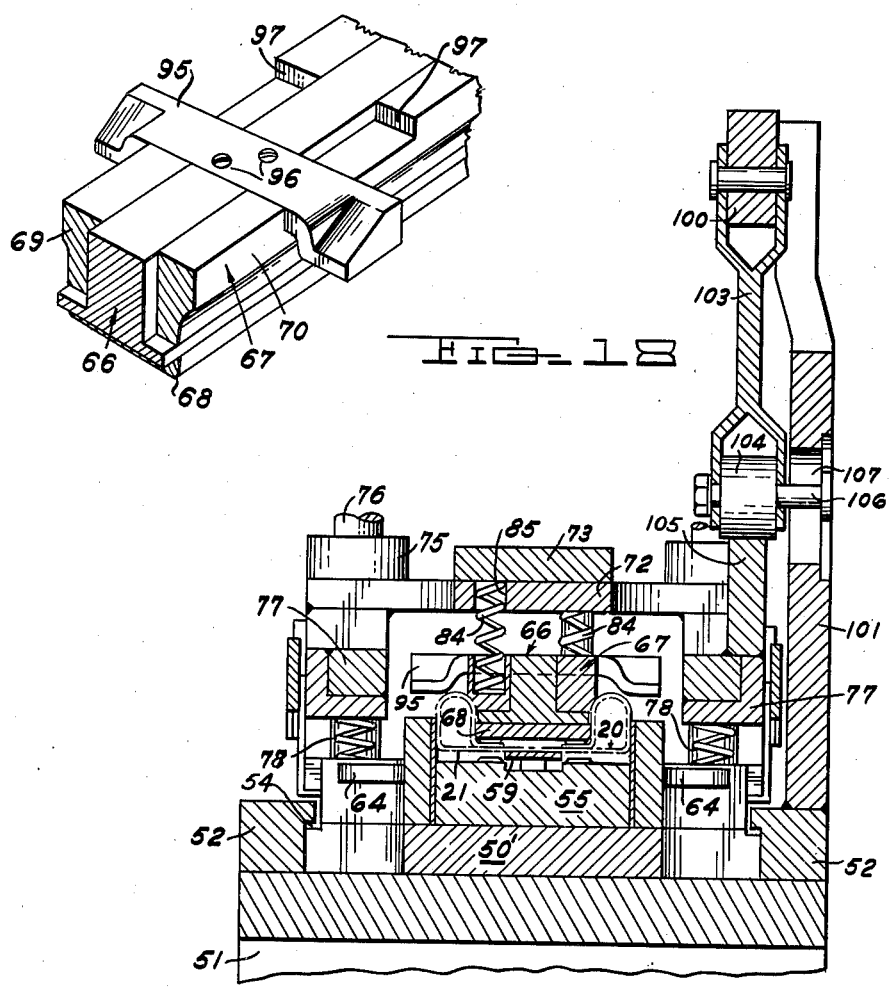
INVENTOR.
Homer G. Kellogg
BY
Whittemore Hulbert & Belknap
ATTORNEYS Patented June 21, 1949

2,473,590

UNITED STATES PATENT OFFICE 2,473,590

METHOD AND APPARATUS FOR ASSEMBLING PARTS

Homer G. Kellogg, Highland Park, Mich., assignor to Motor Products Corporation, Detroit, Mich., a corporation of New York Application November 18, 1946, Serial No. 710,525

13 Claims. (Cl. 1—1)

This invention relates to an improved method and apparatus for riveting material.

One of the objects of this invention is to rivet the material at preselected locations while the material is moved continuously along a path of travel. This arrangement greatly facilitates riveting two or more parts together, and is especially applicable where the parts are in the form of elongated strips, because it enables performing the riveting operation at the delivery end of the equipment employed to roll the strips. Thus, with the present invention, rolling of the strips and riveting the strips together may be performed in one continuous operation without stopping or handling the strips.

Another object of this invention is to successively cut rivets from a length of rivet stock and to punch the material while it is being continuously advanced by forcing the rivets through the material.

Still another object of this invention is to provide an assembly for cutting a rivet from the lower end of a length of stock supported to one side of the path of advancement of the material, advancing the rivet with the material into registration with a punch, moving the punch and rivet in the direction of advancement of the material at the same rate as the material, punching the material while the latter is in motion by forcing the rivet through the material with the punch, returning the assembly to its retracted position and feeding another length of rivet stock to the assembly.

The foregoing as well as other objects will be made more apparent as this description proceeds, especially when considered in connection with the accompanying drawings, wherein:

Figure 1 is a sectional view taken on the line 1—1 of Figure 2;

Figure 2 is a cross sectional view taken on the line 2—2 of Figure 1;

Figure 3 is a sectional view similar to Figure 1 showing the parts in a different position;

Figure 4 is a cross sectional view taken substantially on the line 4—4 of Figure 3;

Figure 5 is a sectional view taken substantially on the line 5—5 of Figure 1;

Figure 6 is a cross sectional view taken on the line 6—6 of Figure 1;

Figure 7 is a sectional view taken on the line 7—7 of Figure 4;

Figures 8, 9 and 10 are respectively cross sectional views taken on the lines 8—8, 9—9 and 10—10 of Figure 1;

Figure 11 is a sectional view taken on the line 11—11 of Figure 9;

Figure 12 is a sectional view taken on the line 12—12 of Figure 10;

Figure 13 is a sectional view taken on the line 13—13 of Figure 8;

Figure 14 is a fragmentary sectional view of a part of the apparatus shown in Figure 1;

Figure 15 is a sectional view taken on the line 15—15 of Figure 1;

Figure 16 is a sectional view taken on the line 16—16 of Figure 15;

Figure 17 is a fragmentary side elevational view of the slide mechanism forming a part of the apparatus;

Figure 18 is a sectional view taken on the line 18—18 of Figure 1; and

Figure 19 is a fragmentary perspective view of a part of the slide mechanism shown in Figure 1.

The method and apparatus forming the subject matter of this invention may be advantageously used wherever it is necessary to secure two or more thicknesses of material together by a multiplicity of rivets. However, for the purpose of illustration, the invention is shown as employed in connection with the fabrication of a strip 20 having a substantially continuous length and having the cross sectional contour indicated in Figures 2, 4 and 6 of the drawings. In detail the strip 20 is rolled by suitable equipment, not shown herein, to form the base portion 21 of the strip with hollow upstanding ribs 22 at opposite longitudinal edges thereof and to also form inwardly extending attaching flanges 23 at the edges of the inner walls of the ribs 22. The flanges 23 are engaged with the base portion 21 of the strip and are rigidly secured to the base portion at longitudinally spaced points by rivets. As will be more fully hereinafter set forth, the above apparatus may be located at the delivery end of the rolling equipment in a position to receive the strip 20 as the latter is discharged from the equipment and is provided with means for riveting the flanges 23 to the base portion 21 of the strip at preselected points without stopping or handling the strip. Thus when the strip leaves the apparatus, it is formed to the desired predetermined cross sectional contour, and the flanges 23 at opposite edges of the strip are riveted to the base portion 21 of the strip.

The apparatus briefly described above is shown in the several figures of the drawings as comprising a frame having a base 24 and having pairs of columns 25 and 26 extending upwardly from the base 24 in spaced relation to each other longitudinally of the base. The strip 20 is advanced between the pair of columns 25 by rolls 27 and 28 having the peripheral portions contoured to cooperate with one another in providing a recess corresponding in shape to the cross sectional contour of the strip 20. The roll 27 is supported below the path of travel of the strip 20 on a shaft 29 having opposite end portions respectively journalled in suitable bearings carried by the columns 25 and having a spur gear 30 secured to one end thereof. The spur gear 30 is adapted to mesh with a corresponding gear 31 forming a part of the driving gear train on the rolling equipment not shown herein. The cooperating roll 28 is positioned above the path of travel of the strip 20 and is secured to a shaft 32 having the opposite ends suitably journalled in bearings carried by the columns 25. The roll 28 is driven in a direction opposite the roll 27 by a gear 33 secured to the shaft 32 and adapted to mesh with a corresponding gear 34 on the shaft 29. The relative positions of the two rolls are such that the peripheral portions thereof frictionally engage opposite sides of the strip 20 and serve to advance the strip through the apparatus in the direction of the arrow indicated by the numeral 35 in Figures 1 and 3 of the drawings.

As the strip 20 is advanced from the pair of columns 25 to the pair of columns 26, rivets 36 are forced through the attaching flanges 23 and base 21 of the strip. The opposite ends of the rivets are peened over as the strip 20 passes between the pair of columns 26 by cooperating rolls 37 and 38. The roll 37 is supported below the strip 20 on a shaft 39 having the opposite end portions respectively journalled in suitable bearings carried by the columns 26. The peripheral portion of the roll 37 is formed with laterally spaced annular grooves 40 for respectively receiving the lower ends of the rivets extending through the opposite attaching flanges 23. The roll 37 is driven in a counterclockwise direction by a spur gear 41 secured to one end of the shaft 39 and adapted to mesh with an idler gear 42 secured to a shaft 43 extending parallel to the shaft 39. The opposite ends of the shaft 43 are respectively journalled in bearings mounted on the base 24 and the gear 42 meshes with an intermediate gear 44. The intermediate gear 44 is secured to a shaft 45 having its axis extending parallel to the axis of the shaft 43 and having the opposite ends suitably journalled in bearings fixed to the base 24. The intermediate gear 44 meshes with an idler gear 46 secured to a shaft 47 extending parallel to the shaft 45 and having the opposite ends journalled in bearings mounted on the base 24. The gear 46 also meshes with the gear 30, so that the riveting roll 37 is rotated by the gear 31 in the same direction as the feed roll 27.

The roll 38 is supported above the path of travel of the strip 20 on a shaft 47 having the opposite ends respectively journalled in bearings mounted on the columns 26. Upon reference to Figure 6 of the drawings, it will be noted that a spur gear 48 is secured to the shaft 47 and meshes with a corresponding spur gear 49 secured to the shaft 39. As a result, the roll 38 is driven in the opposite direction from the roll 37. It will further be noted from Figure 6 of the drawings that the roll 38 comprises a pair of axially spaced sections 50 having annular grooves 51 respectively registering with the annular grooves 40 in the periphery of the roll 37 to engage the upper ends of the rivets extending through the opposite attaching flanges 23 on the strip. The arrangement is such that the two rolls cooperate with one another to peen opposite ends of the rivets as the strip 20 passes therebetween, and in this manner, the attaching flanges 23 are rigidly secured to the base portion 21 of the strip 20.

It has been stated above that the rivets 36 are forced through the strip 20 as the latter advances between the two sets of rolls on the columns 25 and 26. For accomplishing this result a slide assembly 47' is supported on the base 24 between the two pairs of columns 25 and 26 for movement in opposite directions in a plane parallel to the path of travel of the strip 20. In detail the slide 47' comprises a top section 48' and a bottom section 49'. The bottom section comprises a generally I-shaped part 50' having the head portions at opposite ends respectively slidably engaging the top surfaces of brackets 51' extending upwardly from and secured to the base 24. As shown particularly in Figures 8 to 10 inclusive, each bracket 51' has a pair of guides 52 respectively secured to the top surface thereof adjacent opposite longitudinal edges of the latter surface. The guides 52 are formed with laterally inwardly extending flanges 53 cooperating with the top surfaces of the brackets 51' to provide recesses 54 for slidably receiving the adjacent edge portions of the heads on the part 50'. The recesses 54 extend in the general direction of movement of the strip 20 and have a depth somewhat greater than the thickness of the part 50' to enable limited upward movement of the section 49 relative to the brackets 51'.

The section 49' also has a part 55 suitably secured to the top surface of the part 50' and having openings therethrough for receiving bushings 56 and 57. The bushings 56 and 57 are spaced from each other in the direction of travel of the strip 20, and are arranged in pairs with the bushings in each pair spaced laterally from each other to respectively register with the attaching flanges 23 at opposite sides of the strip 20. In the present instance the bushings at one side of the strip 20 are staggered with respect to the bushings at the opposite side of the strip, and the part 50' is formed with openings 58 in alignment with the bushings. It will also be understood from the following description that the purpose of the bushings and openings 58 is to enable dispensing the stock stamped from the sheet 20 by the rivets 36.

Referring again to Figures 8 to 10 inclusive, is will be noted that the part 55 supports a pressure pad 59 positioned to frictionally engage the bottom surface of the strip 20 between the laterally spaced rivets 36. In detail the pad 59 extends for substantially the full length of the section 49' and is yieldably urged into engagement with the base 21 of the strip 20 by springs 60 located in recesses formed in the part 55. Shifting movement of the pad 59 relative to the section 49' is prevented by pins 61 projecting downwardly from the pad 59 into recesses 62 formed in the part 55. The purpose of the pad 59 is to yieldably urge the strip 20 into engagement with the top section, and it will be noted that the top surface of the part 55 is formed with a recess 63 for receiving the pad 59 upon upward movement of the section 49'.

Upon reference to Figures 2, 4 and 7 of the drawings, it will be noted that the part 55 is provided with laterally outwardly extending cam engaging surfaces 64 between the head portions at opposite ends of the part 50' for respectively engaging a pair of cams 65. The cams 65 are secured to the shaft 45 and are fashioned to raise the slide section 49 three times for each revolution of the shaft 45.

The top section 48' of the slide 47' is provided with a pair of members 66 and 67 supported for relative sliding movement in opposite directions along the path of travel of the strip 20. As shown particularly in Figure 19, the member 66 is substantially inverted T-shaped, and is slidably supported in a correspondingly shaped recess formed in the member 67. Actually, the member 67 is assembled from three parts indicated in Figure 19 by the reference characters 68, 69 and 70. The above parts are secured together at opposite ends by spacers 71 to form the inverted T-shaped slot.

The section 47' of the slide also has a member 72 positioned above the member 66 and being substantially I-shaped in configuration. The relatively narrow section of the member 72 is reinforced by a strip 73 secured against the top surface of the member 72 by fastener elements 74. The opposite ends of each of the head portions of the member 72 are provided with bushings 75 for slidably receiving guide pins 76. The guide pins 76 extend downwardly through a pair of rails 77 suitably secured to the underside of the member 72 and project through aligned openings formed in the parts 55 and 56' of the section 49'. The above construction is best shown in Figures 8 to 11 inclusive, and it will be apparent that the pins serve to guide relative vertical movement of the two sections of the slide 47'. It will also be noted from Figures 9 and 11 that the two sections of the slide are normally urged in directions away from each other by means of coil springs 78 having the upper ends seated in recesses 79 formed in the adjacent portions of the rails 77 and having the lower ends extending through openings 80 in the part 55 into recesses 81 formed in the part 50'.

The members 66 and 67 are tied to the member 72 by pins 82 having the upper ends extending through openings in the member 72 and abutting the bottom surface of the reinforcing strip 73. The lower ends of the pins respectively slidably engage in openings 83 formed in the parts 69 and 70 adjacent opposite ends of the latter. The members 66 and 67 are yieldably urged as a unit toward the top surface of the strip 20 by coil springs 84 having the upper ends extending into openings 85 formed in the member 72 and abutting the reinforcing strip 73. The lower ends of the coil springs 84 respectively engage in recesses 86 formed in the rails 69 and 70 adjacent the pins 82.

Extending transversely of the slide 47' above the latter is a shaft 87 having the opposite ends journalled in bearings suitably supported on columns 88 mounted on the base 24 between the columns 25 and 26. The shaft 87 is driven by a gear 89 secured to one end of the shaft and arranged to mesh with a gear 90 secured to the shaft 45. A pair of cams 91 are secured to the shaft 87 at points spaced from each other axially of the shaft 87 and assume positions at opposite sides of the intermediate portion of the I-shaped member 72. Each cam 91 is formed with two diametrically opposite cam portions 92 and 93. The cam portions 92 are arranged to respectively engage the rails 77 at opposite sides of the member 72 and thereby move the member 72 and associated parts downwardly. It will be noted that this downward movement is guided by the pins 82 and is also transferred to both the members 66 and 67 through the coil springs 84. The cam portions 93 respectively engage opposite ends of a cross member 95 shown in Figure 19 of the drawings as secured to the member 66 intermediate the ends thereof by fastener elements 96. The opposite ends of the cross member project through elongated slots 97 formed in the parts 67 and 69 to enable shifting movement of the member 66 relative to the member 67 in opposite directions along the path of travel of the strip 20. It will be noted from Figure 19 that the opposite ends of the member 95 are shaped to engage the cam portions 93 and to cooperate with the latter in moving the member 66 in the direction of advancement of the strip 20 to the position shown in Figure 3 of the drawings. This movement of the member 66 is opposed, however, by a spring 98 shown in Figure 13 of the drawings as having one end engaging the front end of the member 66 and having the opposite end abutting the adjacent cross member 71. The purpose of the spring 98 is to normally hold the member 66 in its retracted position shown in Figure 1 of the drawings. It is desired, however, to prevent return movement of the member 66 for a predetermined interval after the cams 93 disengage the member 95, and this is accomplished by providing stops 99 at opposite sides of the part 55. These stops are positioned to engage the front edges of the cross member 95 as the part 55 is moved upwardly by the cams 65. Thus the member 66 is held in its advanced position until the cams 65 release the part 55 and the springs 78 return the part 55 to its lowermost position. When this takes place, the stops 99 are disengaged from the cross member 95, and the spring 98 returns the member 66 to its retracted position.

It follows from the above that the cams 65 and the cams 92 cooperate to move the sections 48' and 49' of the slide 47' toward the strip 20. In this connection, attention is directed particularly to Figure 7 of the drawings, wherein it will be noted that the cams 92 are assisted in moving the top section 48' downwardly by mechanism comprising a link 100 pivoted intermediate its ends on a support 101 extending upwardly from one of the guide rails 52 in the manner shown in Figure 18 of the drawings. One end of the link 100 is shaped to engage the adjacent cam 92 and the opposite end of the link is connected to the upper end of an arm 103 having a roller 104 supported at the lower end thereof. The roller engages a projection 105 extending upwardly from the adjacent rail 77 and the shaft 106 of the roller is guided in a vertical slot 107 in the support 101. The arrangement is such that when the cams 92 engage the top surfaces of the rails 77, one of the cams also engages the front end of the link 100. Thus as the top section 48' is moved downwardly by the cams 92, the link 100 is rocked in a clockwise direction about its pivotal connection with the support 101, and a downward thrust is applied to the top section adjacent the rear end thereof through the arm 103 and associated roller 104. It will be noted from the above that the auxiliary pressure applying roller 104 is fixed against sliding movement with the slide 47'. However, it will also be noted from Figure 7 of the drawings that the cam engaging surface 106 on the link 100 and the projection 105 are of a length which corresponds to the extent of sliding movement of the slide 47'.

In order to assure uniform movement of the two sections of the slide toward one another, the construction shown in Figure 17 is provided. In detail the rear end portions of a pair of links 107' are respectively pivoted to the sections 48' and 49' at each side of the latter. The front ends of the links 107' at each side of the slide are pivoted together and are pivoted to the rear end of a link 108 having the front end pivoted to the corresponding ends of a pair of links 109. The rear ends of the links 109 are respectively pivoted to the sections 48' and 49'. The above linkage at opposite sides of the slide prevents cocking or tilting of the two slide sections 48' and 49' as the latter are moved toward and away from each other.

Referring to Figures 1 to 4 inclusive, it will be noted that two pairs of punches 110 and 111 are secured to the member 72 of the slide section 48'. The pair of punches 110 are spaced rearwardly from the pair of punches 111 and the punches of each pair are staggered with respect to each other in the manner shown in Figure 5 of the drawings. The punches 110 are actually aligned with the bushings 56 in the section 49' and respectively project through openings 112 formed in the parts 69 and 70 of the member 67. The pair of punches 111 are aligned with the bushings 57 in the slide section 49' and respectively extend through openings 113 formed in the parts 69 and 70 of the member 67. Thus, it will be noted that the punches are moved downwardly as a unit with the slide section 48', or in other words, with the member 72.

It will be noted from Figures 1 to 3 inclusive of the drawings that two pairs of bushings 114 and 115 are also carried by the section 48' of the slide 47'. The pair of bushings 114 are respectively secured in openings formed in the parts 69 and 70. The pair of bushings 115 are also respectively secured in openings formed in the parts 69 and 70. The bushings 114 are spaced forwardly from the punches 110 and the bushings 115 are spaced forwardly from the punches 111. Actually, the spacing between the bushings of each pair is identical to the spacing between the punches of each pair, and this arrangement will be understood upon considering Figure 5 of the drawings. The purpose of the bushings is to support substantially continuous lengths of bushing stock 116. One length of bushing stock is extended through each of the bushings 114 and 115 in the manner clearly shown in Figures 1 to 3 inclusive. It will be noted that the reinforcing strip 73 and the member 72 are formed with aligned openings 117' to receive the various lengths of bushing stock.

The flanges on the inverted T-shaped member 66 are formed with two pairs of openings 117 and 118. The pair of openings 117 are adapted to respectively register with the bushings 114 and the pair of openings 118 are adapted to respectively register with the bushings 115. The construction is such as to enable projecting the lower ends of the bushing stock through the openings 117 and 118 into engagement with the top surface of the part 68, so that rearward movement of the member 66 relative to the member 67 shears four rivets from the respective lengths of stock 116 and locates these rivets in alignment with the pairs of openings 119 and 120 formed in the part 68 of the member 67. Actually, the openings 119 in the part 68 are in alignment with the punches 110 and bushings 56, while the openings 120 in the part 68 are in alignment with the punches 111 and the bushings 57.

It follows from the above that rearward movement of the member 66 by the cams 93 not only shears rivets from the respective lengths of rivet stock, but also locates the rivets in alignment with the punches. Thus the extent of rearward movement of the member 66 must be accurately determined to assure alignment of the punches with the rivets and with the bushings 56 and 58. This alignment is assured by forming openings 121 in the flanges of the inverted T-shaped member 66 for receiving the pins 82 upon downward movement of the punches or slide section 48'. The pins 82 are accurately positioned, so that when they are engaged in the openings 121, the member 66 is located with the openings 119 and 120 in accurate alignment with the punches 110 and 111, respectively. Thus downward movement of the punches by the cams 92 engages the punches with the rivets and forces the latter out of the openings 119 and 120, and through the strip 20. The slugs resulting from punching the work pass through the bushings 56 and 57 to the openings 58.

In as much as the strip 20 moves continuously between the slide sections, it is, of course, necessary to advance the slide at the same rate as the strip during the punching operation. The above is accomplished by a cam 122 mounted on the shaft 32 and having three equally spaced cam portions 123 for successively engaging the front end of a plunger 124. The plunger 124 is suitably slidably supported intermediate its ends on a part 127 of the machine frame with the rear end engaging an abutment 125. It follows from the above that the cam 122 rotates at the same rate as the feed roll 28 and advances the slide 47' along the path of travel of the strip 20 three times for each revolution of the feed roll. The duration of each forward movement of the slide 47' is sufficient to effect the punching operation. Return movement of the slide is effected by a second cam 126 secured to the shaft 47 and having three equally spaced cam portions 127 arranged 60° out of phase with the cam portions 123 previously described. The cam portions 127 successively engage the rear end of a plunger 128 slidably supported in a part 129 of the machine frame and having the front end engaging an abutment 130 carried by the adjacent guide pins 76.

It has been pointed out above that the cams 65, 122 and 126 are each provided with three equally spaced cam portions. The cams 122 and 126 are timed with respect to one another to successively move the slide 47' in opposite directions, and the cam 65 is timed with respect to the cam 122 to move the bottom section 49' of the slide toward the top section 48' as the slide 47' is advanced by the cam 122. The cams 91 differ from the above cams in that they only have two actuating portions 92 and 93. However, the gear 89 for rotating the cams 91 is sufficiently smaller than its driving gear 90 to rotate the cams 91 at the increased speed required to engage the cam portions 92 with the top slide section 48' at the same time one of the three actuating portions of the cam 65 engages the bottom slide section 49', and to engage the cam portions 93 with the opposite ends of the cross member 95 to advance the member 66 each time the slide 47' is advanced by one of the three cam portions 123 on the cam 122.

Although it is possible to feed the rivet stock by gravity, nevertheless, provision is made herein for positively feeding this stock in timed relation to movement of the slide 47'. As shown in Figures 1 and 3 of the drawings, a bracket 131 is secured to the columns 25 and has a portion 132 extending rearwardly above the slide 47'. The portion 132 is formed with longitudinally spaced recesses 133 and 134 for respectively receiving cross members 135 and 136. The cross members are respectively formed with recesses 137 at opposite sides of the member 132 and each recess has an opening 138 in the bottom thereof for receiving a length 116 of rivet stock. As shown in Figure 16 of the drawings, a clutch member 139 is secured in each recess 137 and balls 140 are supported in the clutch member 139 for engagement with opposite sides of the length of rivet stock. The side walls of the clutch are tapered inwardly toward the rivet stock, and the balls are urged into wedging engagement with the rivet stock by springs 141. It will be noted that the cross members 135 and 136 move as a unit with the slide relative to the bracket 132 and the latter is formed with cam surfaces 142 for raising the cross members upon forward movement of the slide. Owing to the clutch arrangement previously discussed, movement of the cross members in an upward direction by the cam surfaces 142 is permitted without interference from the clutch balls 140. This upward movement of the cross members, however, is opposed by coil springs 143 so that the cross members are yieldably urged into frictional engagement with the bracket 132.

Located directly below each of the cross members above described are additional cross members 144 and 145. These cross members are identical in construction to the cross members above described and are secured to a plate 146. The plate 146 is, in turn, secured to the abutment 125 by a post 147 and, as a result, moves as a unit with the slide. The clutch balls 148 frictionally engage opposite sides of the rivet stock and prevent upward movement of the stock by the cross members 135 and 136 when the latter are moved upwardly by the cams 142. However, upon return movement of the slide to its retracted position, the cross members 135 and 136 are lowered by the springs 143. Since the balls 140 grip the rivet stock, it follows that the rivet stock is correspondingly moved or fed downwardly. This downward movement of the rivet stock is permitted by the cross members 144 and 145, since the balls 148 do not act on the rivet stock in this direction of movement thereof. Of course, the downward feeding of the rivet stock is timed with the retracting movement of the slide, so that as soon as the slide assumes its retracted position, the rivet stock is advanced or fed into the openings 117 and 118 in the flanges of the inverted T-shaped member 66.

Operation

As the strip 20 is advanced along its path of travel between the sections 48' and 49' of the slide 47', the member 66 is shifted in the direction of advancement of the strip by engagement of the cams 93 with the opposite ends of the cross member 95 on the member 66. During rearward movement of the member 66 relative to the cooperating member 67, rivets 36 are actually sheared from the lower ends of the lengths of stock 116, and these rivets are advanced to a position in alignment with the punches 110 and 111. After the member 66 is advanced relative to the member 67 to the above operative position, the cams 65 and 92 cooperate to move the slide sections 48' and 49' toward one another. Upon initial operation of the cams to effect movement of the slide sections toward each other, one of the cam portions 123 on the cam 122 engages the plunger 124 and advances the slide as a unit in the same direction as the strip 20, and at the same rate. As the section 49' of the slide moves toward the strip 20, the upper ends of the bushings 56 and 58 engage the underside of the strip 20 in alignment with the openings 119 and 120 respectively. Also, the pins 82 on the member 72 engage in the openings 121 on the member 66 to accurately locate the member 66 with the rivets therein directly in alignment with the punches. In addition, upward movement of the section 49' of the slide by the cams 65 positions the stops 99 on the part 55 in engagement with the front edges of the cross member 95 on the member 66 to hold the member 66 in its advanced position.

Continued relative movement of the slide sections toward one another is effected during advancement of the slide as a unit with the strip 20 and serves to punch the strip 20 by forcing the rivets 36 through the selected portions of the strip. Advancement of the slide 47' with the strip 20 is discontinued as soon as the punching operation is completed and the strip with the rivets 36 therein is passed between the riveting rolls 37 and 38 to peen the opposite ends of the rivets. In this connection, attention is directed to Figure 14 of the drawings, wherein it will be noted that the leading sides of the bushings 56 and 58 and the corresponding sides of the projections 150 are cut away to provide slots 151 of sufficient size to provide clearance for the rivets 36.

It will also be noted that upon completion of the punching operation, the cams 65 and 92 are advanced sufficiently to enable the springs 78 to again separate the slide sections. During this operation, the pins 82 are removed from the openings 121 in the member 66 and the stops 99 are withdrawn from the path of travel of the cross member 95, so that the spring 98 may operate to retract the member 66 relative to the member 67. During this operation, the cam 126 cooperates with the plunger 128 to return the slide as a unit to its retracted position shown in Figure 1 of the drawings. When the member 66 is moved to its retracted position, the openings 117 and 118 are again aligned with the respective bushings 114 and 115. As soon as these openings are aligned with the bushings and during return movement of the slide, the bushing stock is fed downwardly through the openings 117 and 118 by the cross members 135 and 136. Thus the apparatus is conditioned for the next cycle of operation.

What I claim as my invention is:

1. An assembly fixture comprising means for advancing stock along a predetermined path of travel, a punch supported to one side of the path of travel of the stock for movement toward and away from the stock, a rivet carrying part movable relative to the punch in the direction of advancement of the stock to register a rivet with the punch, means operating in timed relation to movement of the rivet carrying member to advance both said member and punch at the same rate as the stock, and means operable during advancement of the punch and member with the stock to move the punch in a direction to force the rivet through the stock.

2. An assembly fixture comprising means for continuously advancing material along a predetermined path of travel, a slide having means for supporting a length of rivet stock at substantially right angles to the path of travel, a punch carried by the slide and spaced from the rivet stock in the direction of advancement of the material, means movable relative to the slide in the direction of travel of the stock to cut a rivet from one end of the stock and advance the rivet to a position in registration with the punch, means responsive to movement of the rivet to a position in registration with the punch to advance the slide at the same rate as the stock, and means operable during advancement of the slide to move the punch in a direction to force the rivet into the material.

3. An assembly fixture comprising means for continuously advancing a length of material along a predetermined path of travel, a slide supported for movement along the path of travel and having first and second parts relatively movable in directions along the path of travel, a length of rivet stock having one end extending through registering openings in the parts, a punch carried by the first part and spaced from the rivet stock in the direction of advancement of the material, means for advancing the second part relative to the first part to cut a rivet from the length of stock and advance the rivet into registration with the punch, means for advancing the slide at the same rate as the material, and means operable during advancement of the slide to move the punch into engagement with the rivet and force the same through the material.

4. An assembly fixture comprising means for continuously advancing a length of material along a predetermined path of travel, a slide alternatively movable in opposite directions along the path of travel and having first and second parts movable relative to each other along said path of travel, a length of rivet stock having one end extending through aligned openings in the parts in the retracted positions of the latter, a punch carried by the first part and spaced from the rivet stock in the direction of advancement of the material, means for advancing the second part relative to the first part to cut a rivet from the length of stock and advance the rivet into registration with the punch, means operable in timed relation to advancement of the second part to advance the slide at the same rate as the material, means operable during advancement of the slide to move the punch into engagement with the rivet and force the latter through the material, means operable in timed relation to the punching operation to retract the slide, and means for retracting the second part relative to the first part to again align the openings in said parts with the length of rivet stock.

5. An assembly fixture comprising means for continuously advancing a length of material along a predetermined path of travel, a slide alternatively movable in opposite directions along the path of travel and having first and second parts movable relative to each other along said path of travel, a length of rivet stock having one end extending through aligned openings in the parts in the retracted positions of the latter, a punch carried by the first part and spaced from the rivet stock in the direction of advancement of the material, means for advancing the second part relative to the first part to cut a rivet from the length of stock and advance the rivet into registration with the punch, means operable in timed relation to advancement of the second part to advance the slide at the same rate as the material, means operable during advancement of the slide to move the punch into engagement with the rivet and force the latter through the material, means operable in timed relation to the punching operation to retract the slide, means for retracting the second part relative to the first part to again align the openings in said parts with the length of rivet stock, and means operable in timed relation to the retracting means for feeding the rivet stock into the aligned openings.

6. An assembly fixture comprising means for continuously advancing a length of material along a predetermined path of travel, a slide alternatively movable in opposite directions along the path of travel and having sections supported at opposite sides of the material for relative movement toward and away from each other, means operable during successive movements of the slide in the direction of advancement of the material to relatively move the sections toward one another, and a punch carried by one of the sections and responsive to relative movement of one of the sections toward the material to punch the latter.

7. An assembly fixture comprising means for continuously advancing a length of material along a predetermined path of travel, means supporting a length of rivet stock to one side of the path of travel with the stock extending perpendicular to the material, a punch positioned to one side of the path of travel and spaced from the rivet stock in the direction of advancement of the material, and means for periodically cutting a rivet from the stock and for advancing the rivet with the material into registration with said punch.

8. An assembly fixture comprising means for continuously advancing a length of material along a predetermined path of travel, means supporting a length of rivet stock to one side of the path of travel with the stock extending perpendicular to the material, a punch positioned to one side of the path of travel and spaced from the rivet stock in the direction of advancement of the material, means for periodically cutting a rivet from the stock and for advancing the rivet with the material into registration with the punch, means operable in timed relation to advancement of the rivet into registration with the punch to advance both the rivet and punch at the same rate as the material, and means operable during advancement of both the rivet and punch with the material to move the punch in a direction toward the material to force the rivet through the material.

9. An assembly fixture comprising means for continuously advancing a length of material along a predetermined path of travel, a pair of superposed parts supported to one side of the path of travel for movement relative to each other in opposite directions along the path of travel and having openings therethrough adapted to assume positions in alignment in the relative retracted position of the parts to receive a portion of the rivet stock, means for relatively moving the parts from the retracted position thereof in the direction of advancement of the material to cut a rivet from the length of stock and to advance the rivet with the material, and means for subsequently relatively moving the parts to their respective retracted positions to again align the openings therethrough for receiving another length of rivet stock.

10. An assembly fixture comprising means for continuously advancing a length of material along a predetermined path of travel, a pair of superposed parts supported to one side of the path of travel for movement relative to each other in opposite directions along the path of travel and having openings therethrough adapted to assume positions in alignment in the relative retracted position of the parts to receive a portion of the rivet stock, means for relatively moving the parts from the retracted position thereof in the direction of advancement of the material to cut a rivet from the length of stock and to advance the rivet with the material, means for subsequently relatively moving the parts to their respective retracted positions to again align the opening therethrough, and means operating in timed relation to relative movement of the parts to align said openings to feed the stock into the latter.

11. An assembly fixture comprising means for continuously advancing a length of material along a predetermined path of travel, a pair of superposed parts supported to one side of the path of travel for movement relative to each other in opposite directions along the path of travel and having openings therethrough adapted to assume positions in alignment in the relative retracted position of the parts to receive a portion of the rivet stock, means for relatively moving the parts from the retracted position thereof in the direction of advancement of the material to cut a rivet from the length of stock and to advance the rivet with the material, means for subsequently relatively moving the parts to their respective retracted positions to again align the openings therethrough for receiving another length of rivet stock, and means operable during advancement of the material to force the rivet through the material.

12. An assembly fixture comprising means for advancing a length of material along a predetermined path of travel, first and second parts supported in superposed relationship to one side of the path of travel for movement relative to each other in opposite directions along the path of travel, said parts having openings therethrough adapted to assume positions in alignment when the parts are in their relative retracted positions, means for supporting a length of rivet stock in the aligned openings, a punch spaced from the rivet stock in the direction of advancement of the length of material and having an end portion registering with an opening through the first part, means for moving the second part relative to the first part from the retracted position aforesaid and in the direction of advancement of the material to cut a rivet from the length of stock and to advance the rivet as a unit with the material into registration with said punch, means operable in timed relation to advancement of the rivet into registration with the punch to advance both said parts with the material, means operable during advancement of both the rivet and punch with the material to move the punch in a direction toward the material to force the rivet through the material, and means for subsequently relatively moving the parts to their retracted positions to again align the rivet stock receiving openings.

13. An assembly fixture comprising means for advancing a length of material along a predetermined path of travel, first and second parts supported in superposed relationship to one side of the path of travel for movement relative to each other in opposite directions along the path of travel, said parts having openings therethrough adapted to assume positions in alignment when the parts are in their retracted position, means for supporting a length of rivet stock in the aligned openings, means for relatively moving the parts from the retracted position thereof in the direction of advancement of the material to cut a rivet from the length of stock and to advance the rivet with the material along said path of travel, means operating in timed relation to relative movement of said parts in the direction of advancement of the material to connect the parts together and impart a continued movement to both parts in the direction of advancement of the material, a punch operating in timed relation to movement of both said parts along the path of travel of the material to force the rivet through the material, and means for subsequently relatively moving the parts to their respective retracted positions to again align the rivet stock receiving openings.

HOMER G. KELLOGG.

REFERENCES CITED

The following references are of record in the file of this patent:

UNITED STATES PATENTS

| Number | Name | Date |
|---|---|---|
| 846,923 | Juengst | Mar. 12, 1907 |